United States Patent
Costa et al.

(10) Patent No.: US 8,990,421 B2
(45) Date of Patent: Mar. 24, 2015

(54) METHOD AND DEVICE FOR PROCESSING DATA IN A NETWORK COMPONENT

(75) Inventors: Elena Costa, München (DE); Josef Martin Eichinger, Neufinsing (DE); Ruediger Halfmann, Otterberg (DE); Thomas Haustein, Potsdam (DE); Jijun Luo, München (DE); Egon Schulz, München (DE); Wolfgang Zirwas, München (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 797 days.

(21) Appl. No.: 12/450,148

(22) PCT Filed: Mar. 10, 2008
(Under 37 CFR 1.47)

(86) PCT No.: PCT/EP2008/052805
§ 371 (c)(1),
(2), (4) Date: Mar. 22, 2010

(87) PCT Pub. No.: WO2008/110525
PCT Pub. Date: Sep. 18, 2008

(65) Prior Publication Data
US 2011/0087797 A1    Apr. 14, 2011

(30) Foreign Application Priority Data
Mar. 12, 2007 (EP) .................... 07005076

(51) Int. Cl.
*G06F 15/16* (2006.01)
*G06F 15/173* (2006.01)
(Continued)

(52) U.S. Cl.
CPC .......... *H04L 65/605* (2013.01); *H04L 67/2823* (2013.01); *H04L 67/2828* (2013.01); *H04L 67/04* (2013.01)
USPC .......................................... 709/232; 709/205

(58) Field of Classification Search
CPC ............. H04L 29/06; H04L 29/06027; H04L 29/06455; H04L 29/06523; H04L 29/08072; H04L 47/10; H04L 47/125; H04L 47/2416; H04L 47/2425; H04L 47/25; H04M 11/085; H04N 7/125; H04N 7/147; H04N 7/148; H04N 7/26; H04N 7/2601; H04N 7/2609; H04N 7/26941; H04N 7/465; H04N 7/50
USPC ............ 375/240.21; 348/14.13; 709/205, 232
See application file for complete search history.

(56) References Cited

U.S. PATENT DOCUMENTS 5,862,480 A * 1/1999 Wild et al. ................. 455/432.2
5,991,300 A * 11/1999 Tappan ......................... 370/392

(Continued)

FOREIGN PATENT DOCUMENTS

CN    1674675 A    9/2005
CN    1926872 A    3/2007

OTHER PUBLICATIONS

"3G/UMTS Evolution: Towards a New Generation of Broadband Mobile Services," UMTS Forum White Paper, Dec. 2006.*

(Continued)

*Primary Examiner* — Melvin H Pollack

(57) ABSTRACT

Data received by a first network component from a second network component is processed by a filter function according to which the whole data or a portion of the data is used.

21 Claims, 3 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 6,111,673 | A * | 8/2000 | Chang et al. | 398/79 |
| 6,141,686 | A * | 10/2000 | Jackowski et al. | 709/224 |
| 6,167,446 | A * | 12/2000 | Lister et al. | 709/223 |
| 6,205,486 | B1 * | 3/2001 | Wei et al. | 709/233 |
| 7,554,922 | B2 * | 6/2009 | Vega-Garcia et al. | 370/241 |
| 7,672,674 | B2 * | 3/2010 | Mahany et al. | 455/452.2 |
| 7,693,171 | B2 * | 4/2010 | Gould | 370/432 |
| 7,751,372 | B2 * | 7/2010 | Monsen | 370/335 |
| 7,773,951 | B2 * | 8/2010 | Molnar et al. | 455/67.13 |
| 7,990,913 | B2 * | 8/2011 | Massiera et al. | 370/328 |
| 8,077,679 | B2 * | 12/2011 | Leung | 370/335 |
| 8,126,127 | B2 * | 2/2012 | Hsu et al. | 379/201.05 |
| 8,175,539 | B2 * | 5/2012 | Diener et al. | 455/69 |
| 8,194,646 | B2 * | 6/2012 | Elliott et al. | 370/352 |
| 8,638,735 | B2 * | 1/2014 | Holt et al. | 370/329 |
| 8,693,347 | B2 * | 4/2014 | Elliott et al. | 370/241 |
| 2004/0085944 | A1 * | 5/2004 | Boehm | 370/338 |
| 2005/0111381 | A1 | 5/2005 | Mukherjee et al. | |
| 2007/0005804 | A1 | 1/2007 | Rideout | |
| 2007/0153914 | A1 * | 7/2007 | Hannuksela et al. | 375/240.26 |
| 2007/0263087 | A1 * | 11/2007 | Hong et al. | 348/14.13 |
| 2008/0101410 | A1 * | 5/2008 | Barkley et al. | 370/473 |
| 2009/0175333 | A1 * | 7/2009 | Hsiang | 375/240.12 |
| 2009/0232202 | A1 * | 9/2009 | Chen et al. | 375/240.02 |
| 2011/0116370 | A1 * | 5/2011 | Trac et al. | 370/230.1 |
| 2012/0269195 | A1 * | 10/2012 | Adamczyk et al. | 370/389 |
| 2012/0321052 | A1 * | 12/2012 | Morrill et al. | 379/32.01 |
| 2014/0059233 | A1 * | 2/2014 | Anschutz et al. | 709/226 |

OTHER PUBLICATIONS

"Mobile TV: The Groundbreaking Dimension," Final Whitepaper, Mobile TV UMTS/GSMA Joint Work Group, Version 2.20, Nov. 2006.*
"HSPA: High Speed Wireless Broadband: From HSDPA to HSUPA and Beyond," UMTS Forum Whitepaper, Jun. 2005.*
Wiljakka, J. "Analysis on IPv6 Transition in Third Generation Partnership Project (3GPP) Networks," RFC 4215, Oct. 2005.*
Nasser, N. and Hassanein, H. "Combined Admission Control Algorithm and Bandwidth Adaptation Algorithm in Multimedia Cellular Networks for QoS Provisioning," Canadian Conference on Electrical and COmputer Engineering, vol. 2, May 2-5, 2004, pp. 1183-1186.*
Kreller, B. et al. "UMTS: a Middleware Architecture and Mobile API Approach," IEEE Personal Communications, vol. 5, Issue 2, Apr. 1998, pp. 32-38.*
Dogan, Safak et al. "Video Content Adaptation using Transcoding for Enabling UMA over UMTS," Fifth Workshop on Image Analysis for Multimedia Interactive Services, Lisbon, 2004.*
Wang, Xin Gang et al. "A QoS-Based Bandwidth Management Scheme in Heterogeneous Wireless Networks," I.J. of Simulation, vol. 5, No. 1-2, 2004.*
D. Wu et al.; "Streaming Video Over the Internet: Approaches and Directions"; IEEE Transactions on Circuits and Systems for Video Technology; vol. 11, No. 3, Mar. 2001; pp. 1-20.
International Search Report for Application No. PCT/EP2008/052805; mailed Aug. 14, 2008.
Office Action issued in copending Chinese Patent Application No. 200880007927.0 issued on Jun. 24, 2014.

* cited by examiner

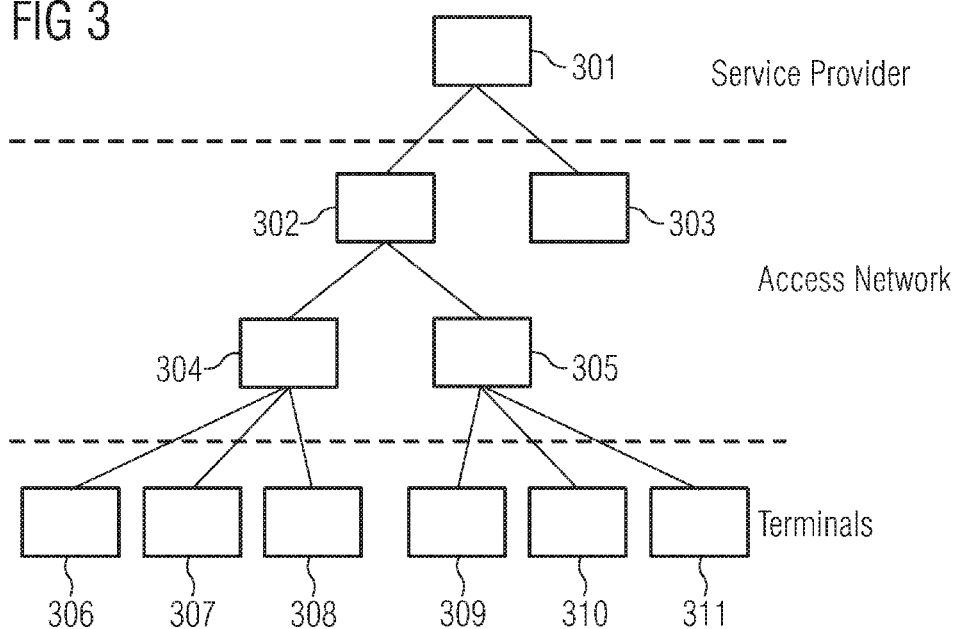
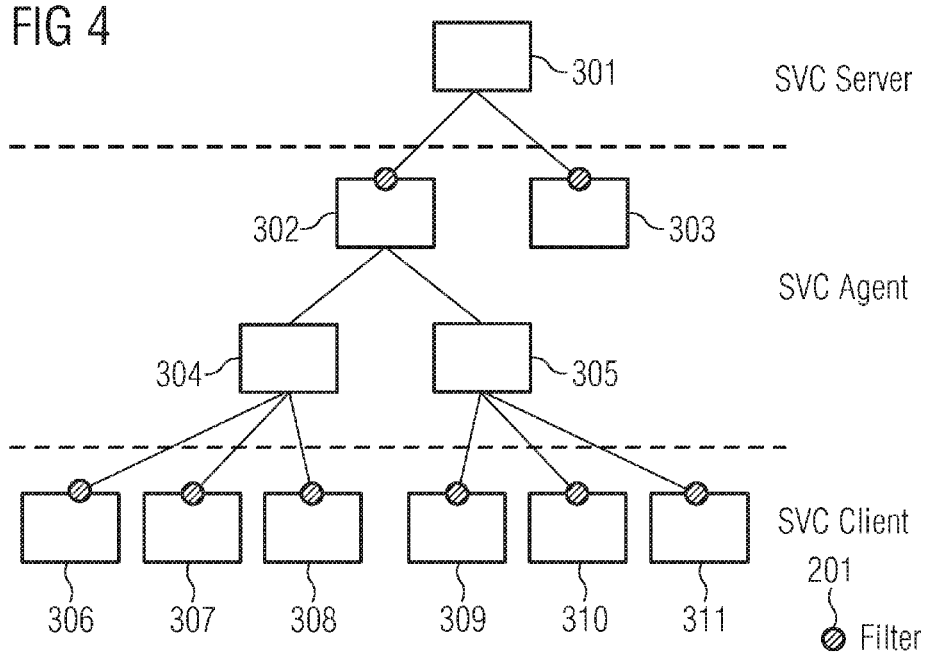

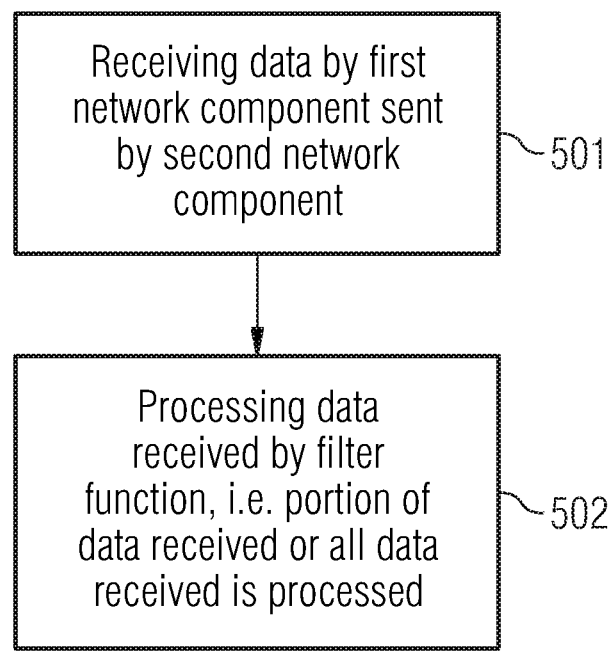

METHOD AND DEVICE FOR PROCESSING DATA IN A NETWORK COMPONENT

CROSS REFERENCE TO RELATED APPLICATIONS

This application is the U.S. national stage of International Application No. PCT/EP2008/052805, filed Mar. 10, 2008 and claims the benefit thereof. The International Application claims the benefits of European Application No. 07005076 filed on Mar. 12, 2007, both applications are incorporated by reference herein in their entirety.

BACKGROUND

Described below is a method and device for processing data in a network component and a system including such a device.

The connection of the air or wireless interface, e.g. via UMTS, allows television to be watched on a mobile phone. However, the overall bandwidth of UMTS is limited and due to its data rate video based streaming services easily consume the bandwidth available.

It is a problem that video streams are rigidly distributed without appropriately taking into consideration limitations of the available bandwidth and/or restrictions of the devices receiving such video streams.

It is also a disadvantage that several streams have to be provided in order to offer streams of different data rate to the terminals. The user or device needs to switch from one such stream to another in order to adapt the bandwidth of the stream processed by the device.

SUMMARY

A system designed to overcome the disadvantages stated before is able to efficiently make use of the available bandwidth and/or to distribute data stream information depending upon the user's needs or requirements.

A method is described below for processing data in a first network component in which
  the data is received by the first network component from a second network component;
  the data is processed by a filter function according to which the whole data or a portion of the data is used.

Hence, it is possible to discard a portion of the data received. This allows the filter function to adjust the amount of data used or processed by the first network component. A selection can be made by the filter whether the whole data or only a portion of the data is used or processed.

The data may be streaming data of various kind, e.g., video streaming data and/or audio streaming data.

In an embodiment, the filter function discards a share of the data or the filter function discards no data.

In a further embodiment the portion of the data or the whole data is used by being processed by the first network component and/or being forwarded to a third network component.

Thus, the data processed can be, e.g., visualized by the first network component if this first network component is, e.g., a terminal such as a user equipment (UE). Alternatively, this data (whole or portion of the data received by the first network component) can be forwarded to, e.g., a terminal (third network component), the first network component being in this case a node within a communication network, e.g., a gateway.

In a further embodiment, the data received by the first network component is data including a base bearer (base layer) and at least one enhancement bearer (enhancement layer). The data can include scalable data, in particular scalable video and/or scalable audio data.

Hence, the first network component may receive data in a scalable form including a base bearer and at least one enhancement bearer. According to the filter function, the data processed by the first network component, e.g., used by this first network component and/or forwarded to the third network component, advantageously includes at least this basic bearer, but it may suppress at least one enhancement bearer.

Due to the scalable concept, the basic bearer contains all information necessary for a basic functionality, e.g., a video stream of rudimentary video resolution and audio quality that could be watched and listened to. Such basic functionality ensures that the basic bearer can be received and used on simple devices and/or in environments of reduced bandwidth.

A first enhancement bearer allows this minimum quality of the data stream to be improved and a second enhancement bearer further improves the quality provided by the first enhancement bearer (in combination with the basic bearer). Hence, the scalable concept only requires the basic bearer to be transmitted, the enhancement layers are optional to, e.g., progressively increase the video and audio quality of the data stream.

In a further embodiment, the data is provided by at least one of the following services:
  hypertext transfer protocol (HTTP);
  scalable video coding (SVC);
  scalable audio coding.

It is yet an embodiment that the filter function is adjusted by at least one of the following:
  a profile of the first network component;
  a profile of a subsequent network component;
  an operation and maintenance profile;
  a bandwidth available or given (by. e.g. network provider or operator);
  resources or hardware available or predetermined within the first network component or a subsequent network component;
  services available or predetermined within the first network component or a subsequent network component.

Hence, according to, e.g., given profiles of the respective (actual or subsequent) network components, the filter can be adjusted to, e.g., reduce the amount of data processed. Also, a predetermined profile can be set by a network operator or a provider. The profile may be dependent on the bandwidth available. Also, the network component can have hardware and/or bandwidth limitations that allow only a certain amount (quality) of data to be visualized or transmitted; the rest of the data (that should not be visualized due to profile restrictions) is dropped in the actual network component or in a preceding network component.

In a further embodiment, a network component (at least one of the first, second or third network components) is an entity of at least one of the following types:
  a fixed access network;
  a radio access network.

Furthermore, the filter function may depend on a service specification thereby enabling service aware filtering.

In another embodiment, a network component (in particular the first network component) can be at least one of the following types:
  a network node;
  a gateway;
  a terminal;
  a user equipment;
  a mobile phone;
  a relay node.

The method described herein may be used by a device for processing data in a processor unit that is equipped such that the method as described is executable on the processor.

In an embodiment, the device can be a communication device, in particular a network component.

The problem is also solved by a communication system including a device implementing the method described herein.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a hierarchical network diagram with a service provider section, an access network and several terminals;

FIG. 4 is a hierarchical network diagram of a structure that may be used for streaming video applications;

FIG. 5 is a flowchart of processing a data in a first network component.

DETAILED DESCRIPTION OF THE PREFERRED EMBODIMENT

Figure 1:
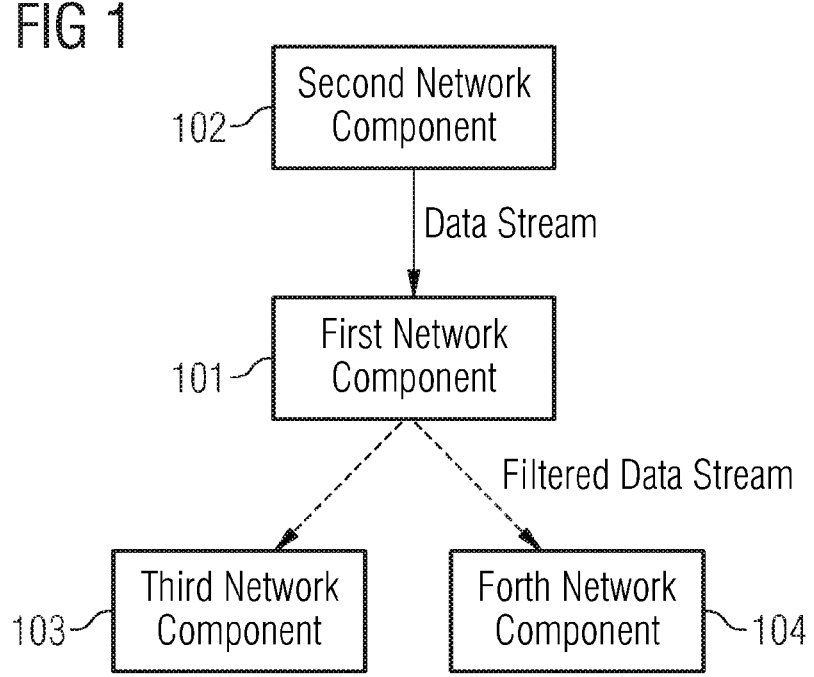
FIG. 1 is a block diagram of a first network component with a previous (second) network component and subsequent (third and forth) network components.

Reference will now be made in detail to the preferred embodiments, examples of which are illustrated in the accompanying drawings, wherein like reference numerals refer to like elements throughout.

With reference to FIG. 1, a first network component 101 receives a data stream that may be a scalable data stream type from a second network component 102. The data stream received is processed by a filter function thereby producing a filtered data stream which is forwarded to a third network component 103 and a forth network component 104. The filtered data stream may include all the information of the data stream received by the first network component 101 or a portion of the data received from the data stream at the first network component 101.

It is possible that the first network component 101 processes the data stream received such that a filtered data stream of a first quality (or data rate) is sent to the third network component 103 whereas a data stream of a second quality (or data rate) is forwarded to the forth network component 104. This may take into consideration that the third network component 103, e.g., due to an air interface with reduced bandwidth, requires a limited quality of the received data stream only, whereas the forth network component 104 could be connected by a fixed line and may supply terminals that could use the full data rate of the data stream received by the first network component.

As an option, the filtered data stream could also be used or processed, e.g., visualized in the first network component 101 itself.

The first network component 101 can be a terminal of high computational power being able to visualize data streams of different, in particular of high, data rate. The first network component 101 can also be a terminal of low computational power and of small display size with limited resolution capabilities. In such case, the filter function can adjust (or be adjusted) to this particular (hardware-)profile of the first network component 101.

However, it is also possible that the third network component 103 and the forth network component 104 have bandwidth limitations (due to the connection with a base station or due to limitations set by a network provider) and should therefore only receive a reduced amount of the data stream received by the first network component 101. Hence, the filter function can be adjusted accordingly and a reduced amount of data is forwarded from the first network component 101 to the third network component 103 and to the forth network component 104.

The connections shown may be of various types: They can be fixed network connections or wireless connections. The filter function may adjust to the capabilities and/or restrictions of the respective network used.

The data stream may me a video data stream and/or an audio data stream. However, all kinds of streamed data could be conveyed through the respective communication network(s).

The bandwidth available may depend on a single network component, in particular on a user terminal. This bandwidth provided could consider the following criteria:

Request of the user;

Feature capability of the network component (terminal of the user): Different terminals allow different features, services or bandwidth (e.g., mobile telephone, personal digital assistant (PDA), Laptop);

Load of the terminal: The actual load of the terminal may have an impact on the bandwidth required for the streaming service (e.g., other services may be used in parallel and (already) consume a certain amount of the bandwidth available);

Actual air interface: According to the actual wireless connection used, different data rates may be recommended, e.g., in a wireless LAN (WLAN) environment, higher data rates may be streamed than in an UMTS or a GPRS environment;

Location of the terminal: Dependent on the actual location of the terminal, different data rates may apply. For example, a terminal at the border of an UMTS cell may receive a reduced data stream in comparison to a terminal at the center of such cell;

Load with the cell: The data rate provided may actually depend on the number of terminals and/or traffic within such cell: The more traffic, the lower the bandwidth that could be provided for streaming services.

It is an advantage of this approach that several services of different bandwidth or streaming rate can be provided by this filter function. Therefore, it is no longer necessary to offer streaming services of different bandwidth in parallel, each such streaming service producing a certain amount of traffic within the network. The solution only needs one streaming service; if a network component or a subsequent network component only needs a portion of the streaming data, there will be no need to switch to another streaming service, but only to discard or filter a portion of the data received. Hence, the network traffic is significantly reduced as the streaming data can be bundled to one streaming service instead of several streaming services each of which producing data traffic of its own.

Applications in the mobile environment increasingly require video coding schemes, which allow scalability according to hardware performance as well as the data rate available. The Moving Pictures Expert Group 2003 developed methods for scalable video coding (SVC). This SVC technique may be advantageously used by the approach provided herewith.

Figure 2:
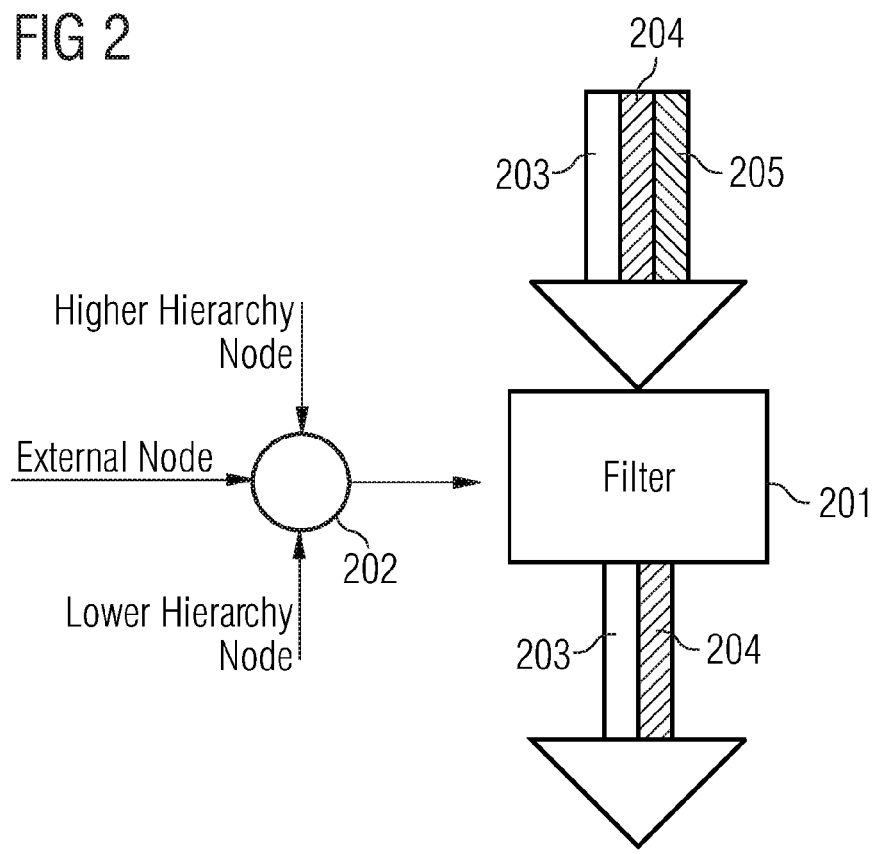
FIG. 2 is a block diagram of a filter that realizes a filter functionality processing an input data stream to an output data stream.

FIG. 2 illustrates a filter 201 to which a data stream including a base bearer 203, a first enhancement bearer 204 and a second enhancement bearer 205 are fed. The filter 201 outputs a data stream of reduced data rate including the base bearer 203 and the first enhancement bearer 204. In this example, the second enhancement bearer 205 has been discarded.

The filter 201 is adjusted by a decision entity 202 which may gather input from a higher hierarchy node, from a lower hierarchy node and/or from an external node.

The higher hierarchy node may be the streaming server (see 301 in FIG. 4), the lower hierarchy node may be profile of mobile terminals (see terminals 306 to 311 in FIG. 4) or base stations (see eNodeB 304, 305 in FIG. 4). The external node may convey predefined adjustments (e.g., operations and maintenance information) from an operator or provider.

The filter 201 can be located inside a network component, e.g. a network node of the access gateway, of a node B or of a terminal.

The data stream input to the filter 201 may be a scalable service, e.g., SVC, HTTP.

The concept shown may apply for the downlink as well as for the uplink.

The services delivered or forwarded by the filter can be transmitted through broadcast, multicast or through dedicated channels.

The approach presented can be applied to fixed networks, radio networks or a combination of both.

FIG. 3 shows an example of a hierarchical network topology. The root 301 includes a network component (node) of a service provider. An access network includes access gateways 302 and 303 that are connected to the root 301, respectively. Further, nodes 304 and 305, which are of so-called type eNodeB, are connected to the access gateway 302 and are also part of the access network. Several terminals (user equipment UE) of various hardware capabilities are connected to the nodes 304 and 305 of the access network.

Terminal 306 is a high-performance laptop computer with a mobile interface that is connected to eNodeB 304. Terminal 307 is a personal digital assistant (PDA) and terminal 308 is a simple mobile phone, both terminals 307 and 308 are connected to eNodeB 304. Terminals 309, 310 and 311 are user equipments that are connected to eNodeB 305.

FIG. 4 shows a similar structure as does FIG. 3. However, the service provider is substituted in FIG. 4 by an SVC Server, the access network corresponds in FIG. 4 to an SVC Agent and the terminals are SVC Clients in FIG. 4. The network components 302 and 303 within the SVC Agent and the SVC clients in FIG. 4 include a filter 201, respectively.

The SVC Client is a terminal that includes an SVC decoder. A base station 304, 305 offers a scalable video stream to its clients via broadcast or multicast services. The respective SVC client then extracts its adequate video stream depending on:
  Requests, preferences of the SVC client's user;
  Capability of the terminal (e.g., size of screen, computing power);
  Current type of connection (e.g., WLAN, UMTS, GPRS);
  Location of the terminal within the network or cell (large scale fading);
  Configuration data transmitted (from base station, service provide or operator);
  Configuration data stored within terminal (e.g., on the SIM-card): The SIM-card type may define the maximum streaming rate supported by the respective terminal; the operator may sell more expensive SIM-cards that allow higher streaming rates.

Scalable video coding (SVC) may be applied not only to the client side, but to different network components within the access network, e.g. to SVC Agent (see FIG. 4). Network components (nodes) that restrict or select the amount of the data stream forwarded to the clients are referred to as SVC Agents. An SVC Agent may be set up according to the following criteria:
  Local configuration data, e.g., current load or capacity of the base station;
  Conveyed current, average or peak configuration data of the respective network component (node): For example, in LTE (3GPP Long Term Evolution), the mobile terminal can convey its current data rate and/or peak rate to the eNodeB, thereby allowing the eNodeB due to such data collected from all mobile terminals to adjust the service provided. Alternatively, it is also possible that the mobile terminals and the eNodeBs convey their configuration data to their associated access gateway, leaving it to the access gateway to adjust the amount of data to be streamed onwards;
  Configuration data transmitted from a third party side, e.g., operation and maintenance data from a service provider or operator.

An example as how to forward different amounts of data streams to different clients is shown in FIG. 4. Data provided by the SVC server 301 is forwarded by SVC agent 302 without any restriction or data reduction to eNodeB 304, whereas the filter function in SVC agent 302 reduces the bandwidth of the data stream by only forwarding the base bearer to eNodeB 305 (in the example, eNodeB only supplies low-end terminal devices 309 to 311).

eNodeB 304 forwards the data stream received to its associated terminals 306 to 308 via an air interface thereby allocating more resources than eNodeB 305 forwarding the base bearer only to its associated terminals 309 to 311.

Hence, the SVC Agent, here access gateway 302 including the filter function, allows an efficient implementation of the multicast service. Only the cell in need of a higher data stream rate (here cell of eNodeB 304) receives the full (or higher) amount of data stream, whereas the other cell only receives the base bearer. However, advantageously, the information about the data rate necessary for each cell is conveyed to the associated access gateway 302.

The SVC clients 306, 307 and 308 each include the filter 201 thereby allowing the respective client 306 to 308 to discard a portion of the data received at each client. As terminals 306 and 307 are capable of processing a high data stream, the filter 201 of those client does not have to discard any data received. Terminal 308 however may be a simple mobile phone which is only capable of using the base bearer of the video stream received from eNodeB 304. Hence, filter 201 of terminal 308 drops the data received but this base bearer.

FIG. 5 shows a method for processing data. In 501 data is received by a first network component sent from a second network component. In 502 the data received is processed by a filter function, wherein a portion of the data or all data received is used by the first network component and/or forwarded to a subsequent network component.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method comprising:
receiving, by a first network component from a second network component, a data stream comprising a base bearer and at least a first enhancement bearer; and
processing the data by a filter function, the filter function making a selection according to which either both the base bearer and the first enhancement bearer are forwarded to a third network component or the first enhancement bearer is discarded and only the base bearer is forwarded to the third network component, and
wherein the filter function is adjusted based on
a bandwidth available.

2. The method according to claim 1, wherein the filter function discards a share of the data or the filter function discards no data.

3. The method according to claim 2, wherein all or a portion of the data is used by at least one of:
processing the data by the first network component; and
forwarding the data to a third network component.

4. The method according to claim 1, wherein the data received by the first network component includes:
at least one of scalable video data and scalable audio data.

5. The method according to claim 1, wherein the network component is an entity of at least one of a fixed access network and a radio access network.

6. The method according to claim 5, wherein the filter function depends on a service specification.

7. The method according to claim 6, wherein the first network component is one of:
a network node;
a gateway;
a terminal;
a user equipment;
a mobile phone; and
a relay node.

8. A device for processing, in a first network component, data received from a second network component, the data comprising a base bearer and at least a first enhancement bearer, the device comprising:
a processor unit programmed to process the data by a filter function according to which the data is sent in a single streaming service to a third network component and a fourth network component, the base bearer being multicast to both the third network component and the fourth network component and the first enhancement bearer being sent only to the fourth network component, and
wherein the filter function determines to multicast the base bearer to both the third network component and the fourth network component and send the first enhancement bearer only to the fourth network component based on a bandwidth available for the third network component and the fourth network component.

9. The device according to claim 8, wherein the device is a communication device used as a network component.

10. A communication system having network components, comprising:
a first network component configured to send a data stream to a second network component, the data stream including a base bearer and at least a first enhancement bearer; and
a second network component configured to receive the data stream from the first network component, the second network component including a device configured to process the data stream by a filter function according to which either both the base bearer and the first enhancement bearer are forwarded to a third network component or the first enhancement bearer is discarded and only the base bearer is forwarded to the third network component, and
wherein the filter function is adjusted based on a bandwidth available.

11. The method of claim 1, wherein the filter function is adjusted based on the bandwidth available of the third network component and a fourth network component.

12. The method of claim 1, wherein the filter function is adjusted based on the bandwidth available and a profile of the first network component.

13. The method of claim 1, wherein the filter function is adjusted based on the bandwidth available and a profile of the third network component.

14. The method of claim 1, wherein the filter function is adjusted based on the bandwidth available and an operation and maintenance profile.

15. The method of claim 1, wherein the filter function is adjusted based on the bandwidth available and hardware available within the first network component.

16. The method of claim 1, wherein the filter function is adjusted based on the bandwidth available and services available within the first network component.

17. The method of claim 1, wherein the bandwidth available is predetermined to correspond to a data rate that depends on a number of network components.

18. The method of claim 1, wherein the filter function is adjusted based on:
the bandwidth available;
a profile of the first network component;
a profile of the third network component;
an operation and maintenance profile;
hardware available within the first network component; and
services available within the first network component.

19. The method of claim 1, wherein:
the base bearer includes information for a basic functionality; and
the first enhancement bearer, in combination with the base bearer, increases a quality of the data stream.

20. The method of claim 1, wherein:
only the base bearer is forwarded to the third network component; and
both the base bearer and the enhancement bearer are forwarded to a fourth network component.

21. The method of claim 1, wherein the bandwidth available is predetermined to correspond to a data rate that depends on a number of user equipments.

* * * * *

UNITED STATES PATENT AND TRADEMARK OFFICE
CERTIFICATE OF CORRECTION

PATENT NO. : 8,990,421 B2 Page 1 of 1
APPLICATION NO. : 12/450148
DATED : March 24, 2015
INVENTOR(S) : Elena Costa et al.

It is certified that error appears in the above-identified patent and that said Letters Patent is hereby corrected as shown below:

On the Title Page, Item (54) and in the Specification, column 1, line 2, in "Title", after "IN" delete "A".

Signed and Sealed this
Fifteenth Day of September, 2015

Michelle K. Lee
*Director of the United States Patent and Trademark Office*